United States Patent [19]

Tatsukami et al.

[11] Patent Number: 4,768,860
[45] Date of Patent: Sep. 6, 1988

[54] PLASTIC OPTICAL CABLE

[75] Inventors: Yoshiharu Tatsukami; Katsuramaru Fujita; Motonobu Furuta, all of Osaka; Yoshitaka Ohbe, Kawanishi, all of Japan

[73] Assignee: Sumitomo Chemical Co., Ltd., Osaka, Japan

[21] Appl. No.: 909,224

[22] Filed: Sep. 19, 1986

[30] Foreign Application Priority Data

Sep. 21, 1985 [JP] Japan .............................. 60-209313
Mar. 11, 1986 [JP] Japan .............................. 61-53084

[51] Int. Cl.$^4$ .................... G02B 6/00; B32B 27/34; B05D 5/06; C08F 120/18
[52] U.S. Cl. ........................... 350/96.34; 350/96.23; 350/96.33; 428/378; 428/394; 428/395; 427/163; 526/329.7
[58] Field of Search .......... 350/96.23, 96.29, 96.30, 350/96.33, 96.34; 428/394, 395, 392, 373, 391, 378; 427/163; 526/329.7, 282

[56] References Cited

U.S. PATENT DOCUMENTS

| | | | |
|---|---|---|---|
| 3,980,390 | 9/1976 | Yamamoto et al. | 350/96.33 |
| 3,993,834 | 11/1976 | Chimura et al. | 350/96.34 |
| 4,105,284 | 8/1978 | Olshansky | 350/96.33 |
| 4,138,194 | 2/1979 | Beasley et al. | 350/96.30 |
| 4,344,669 | 8/1982 | Uchida et al. | 350/96.30 |
| 4,505,543 | 3/1985 | Ueba et al. | 350/96.34 |
| 4,542,957 | 9/1985 | Ishiwari et al. | 350/96.34 |
| 4,564,263 | 1/1986 | Ueba et al. | 350/96.34 |
| 4,576,438 | 3/1986 | Tatsukami et al. | 350/96.34 |
| 4,591,626 | 5/1986 | Kawai et al. | 526/282 |
| 4,681,400 | 7/1987 | Ueba et al. | 350/96.34 |
| 4,702,554 | 10/1987 | Takahashi et al. | 350/96.34 X |
| 4,707,076 | 11/1987 | Skutnik et al. | 350/96.34 |
| 4,708,833 | 11/1987 | Ohsawa et al. | 350/96.34 X |
| 4,718,748 | 1/1988 | Broer et al. | 350/96.34 X |

FOREIGN PATENT DOCUMENTS

| | | | |
|---|---|---|---|
| 0097325 | 1/1984 | European Pat. Off. | 350/96.34 X |
| 59-226302 | 12/1984 | Japan | 350/96.34 X |
| 2026716 | 2/1980 | United Kingdom | 350/96.30 |

Primary Examiner—William L. Sikes
Assistant Examiner—Brian M. Healy
Attorney, Agent, or Firm—Birch, Stewart, Kolasch & Birch

[57] ABSTRACT

A plastic optical cable comprising a core, a cladding layer and a protective layer made of an ester type thermoplastic elastomer, which has low degree of thermal shrinkage and low attenuation of light transmission even at high temperature.

3 Claims, 1 Drawing Sheet

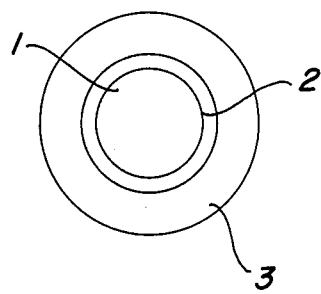

PLASTIC OPTICAL CABLE

BACKGROUND OF THE INVENTION

1. Field of the Invention

The present invention relates to an optical cable made of plastics (hereinafter referred to as "plastic optical cable").

2. Description of Prior Arts

Hitherto, optical fibers made from inorganic glass are known and widely used as optical signal-transmitting mediums. They are, however, poor in processability and weak against flexural stress. Due to these drawbacks of the glass optical fibers, attempts have been made to develop an optical fiber made of a plastic (hereinafter referred to as "plastic optical fiber"). As the plastic optical fiber, there is known a plastic fiber comprising a core made of a polymer having a comparatively large refractive index and good light transmission (e.g. methacrylic polymers and styrene base polymers) and a cladding made of a transparent polymer having a smaller refractive index than that of the core (e.g. fluorine-containing polymers) (hereinafter referred to as "bare fiber"). The conventional plastic optical fiber has still insufficient heat resistance so that its applications have been limited.

In view of the above circumstances, we have proposed an optical fiber with good heat resistance and light transmission which comprises a core made of a polymer comprising methyl methacrylate containing 3 to 40% by weight of a methacrylic ester the ester moiety of which has alicyclic hydrocarbon group of 8 or more carbon atoms and a cladding made of a transparent resin or a fluororubber having a refractive index at least 3% smaller than that of the core polymer (cf. U.S. Ser. No. 504,861 filed on June 16, 1983 and European Patent Application No. 83 105 869.8 filed on June 15, 1983 corresponding to Eur. Pat. No. 0 097325).

For the purpose of applying the bare fiber of the optical fiber comprising the core and the cladding to an optical trnasmission system, it is necessary to fabricate an optical cable from the bare fiber by coating it with a resin, namely by forming a protective layer thereon. As an example of the cable fabrication techniques, Japanese Patent Kokai Publication (unexamined) No. 226302/1984 proposes coating of the bare fiber with a thermoplastic resin such as polyvinyl chloride to produce an optical cable having improved heat resistance and mechanical properties.

However, since the optical cable coated with the thermoplastic resin has a large degree of thermal shrinkage, it suffers from a decrease of optical transmission due to thermal shrinkage when it is installed in or near a hot place such as an engine room of an automobile or a vessel. Thus, it lacks reliability in practical use and is not satisfactory as a practically usable optical cable.

SUMMARY OF THE INVENTION

One object of the present invention is to provide a plastic optical cable having good mechanical properties and good light transmission even at high temperature, for example, at 80° C. or higher.

Another object of the present invention is to provide a plastic optical fiber having a small degree of thermal shrinkage.

A further object of the present invention is to provide a plastic optical cable having good weather resistance and chemical resistance.

These and other objects are accomplished by a plastic optical cable of the invention which comprises a core layer, a cladding layer and a protective layer made of an ester type thermoplastic elastomer.

BRIEF DESCRIPTION OF THE DRAWING

The FIGURE is a cross sectional view of a plastic optical cable of the present invention having a core 1, a cladding layer 2, and a protective layer 3.

DETAILED DESCRIPTION OF THE INVENTION

Characteristics of the plastic optical cable of the present invention reside in that it can be used without a substantial decrease of light transmission at a high temperature, for example, 80° C. or higher at which the conventional optical cable cannot be used, and further it has good mechanical properties such as flexibility, chemical resistance and weather resistance. A degree of thermal shrinkage of the optical cable of the present invention can be 5% or less after being dry heated at 120° C. for 240 hours. Such dry heating is carried out by placing an optical cable in a water-free atmosphere of a suitable gas, usually air, under arbitrary pressure and heating the atmosphere by a suitable heating means at 120° C. for 240 hours. When the optical cable has a degree of thermal shrinkage of larger than 5%, the optical transmission tends to decrease or connection of the optical cable with a connector fails. In this context, the degree of thermal shrinkage (%) is calculated by the following equation:

$$\text{Degree of thermal shrinkage (\%)} = \frac{L_0 - L}{L_0} \times 100$$

wherein $L_0$ is a length of the optical cable before being dry heated and L is a length of the optical cable after being dry heated.

The core layer of the optical cable may be made of a methacrylate polymer or a styrene base polymer. Preferred is a polymer comprising methyl methacrylate containing 3 to 40% by weight of a methacrylic ester the ester moiety of which has alicyclic hydrocarbon group of 8 to 20 carbon atoms since it has a high thermal stability. The methacrylate ester the ester moiety of which has the alicyclic hydrocarbon group having 8 to 20 carbon atoms may be prepared by esterifying methacrylic acid or its chloride with an alicyclic hydrocarbon monohydric alcohol (namely a monohydric alcohol derived from a corresponding alicyclic hydrocarbon). Specific examples of the monohydric alicyclic alcohol are 2,6-dimethylcyclohexanol, borneol, isoborneol, l-menthol, fenchyl alcohol, p-menthanol-2, 1-adamantanol, 3-methyl-1-adamantanol, 3,5-dimethyl-1-adamantanol, tricyclo[5,2,1,0$^{2,6}$]decan-8-ol, and the like. Specific examples of corresponding mechacrylic ester are fenchyl methacrylate, l-menthyl methacrylate, bornyl methacrylate, isobornyl methacrylate, 1-adamantyl methacrylate, 3,5-dimethyl-1-adamantyl methacrylate, tricyclo[5,2,1,0$^{2,6}$]dec-8-yl methacrylate, and the like.

When the content of said methacrylic ester is less than 3% by weight, the heat resistance of the core is not sufficiently increased although the core has good flexibility. When it is larger than 40% by weight, the flexibility of the core is not so improved although the heat resistance is increased. The methacrylic ester having the alicyclic hydrocarbon group of 8 to 20 carbon atoms in its ester moiety has less attenuation of light transmission than that having an aromatic hydrocarbon group in its ester moiety so that the polymer of the former methacrylic ester can be widely used as a light transmission medium. Among the alicyclic hydrocarbon group having 8 to 20 carbon atoms, those having at least 10 carbon atoms can effectively increase the heat resistance of the core polymer, while those having less than 7 carbon atoms do not sufficiently increase the heat resistance of the polymer. When the alicyclic hydrocarbon group has more than 20 carbon atoms, the mechanical properties of the produced polymer tends to be deteriorated. A polymer of a methacrylic ester the ester moiety of which is a linear hydrocarbon having 8 or more carbon atoms, for example, n-octyl methacrylate and n-dodecyl methacrylate has insufficient heat resistance.

In the present invention, the methacrylic ester may be copolymerized with an alkyl acrylate in which the alkyl group has 1 to 4 carbon atoms. To impart good heat resistance to the polymer, the content of the alkyl acrylate should be as small as possible, preferably 5% by weight or less.

The cladding layer is made of a transparent resin or a fluoroelastomer having a refractive index at least 3% smaller than that of the core polymer. When the refractive index of the cladding material is smaller than that of the core material is less than 3%, the light reflection by the cladding layer is small, and the attenuation of light transmission is great. Practically, the refractive index of the cladding layer is 1.42 or less. Preferably the cladding polymeric material is not crystalline but nearly amorphous and has good adhesiveness to the core material.

Examples of the transparent resin and the fluoroelastomer are fluororesins, thermoplastic fluororubbers and fluororubbers.

Specific examples of the fluororesins are a fluorine-containing acrylic or methacrylic homo- or co-polymers comprising fluoroalkyl α-fluoroacrylate, alkyl α-fluoroacrylate, fluoroalkyl methacrylate and the like and a fluorine-containing homo- or co-polymers comprising a fluoroolefin. Among the polymers comprising fluoroalkyl α-fluoroacrylate, alkyl α-fluoroacrylate or fluoroalkyl methacrylate, preferred are those comprising the monomer a homopolymer of which has a softening point of about 50° C. or higher and a refractive index of 1.43 or less. Specific examples of the fluoroolefin polymer are vinylidene fluoride-tetrafluoroethylene copolymers, trifluoroethylene-vinylidene fluoride copolymers, vinylidene fluoride-tetrafluoroethylene-hexafluoropropene terpolymers and the like.

The thermoplastic fluororubber are polymers which comprises soft segments of fluorine-containing rubber and hard segments of fluorine-containing resins and can be physically vulcanized in the part of the fluorine-containing resins at room temperature to show a rubbery elasticity and behave as thermoplastics at high temperature over the melting point. An example of the thermoplastic fluororubber is "Dai-el" (trade mark) thermoplastic manufactured by Daikin Industries Ltd.

Examples of the fluororubber are vinylidene fluoride-hexafluoropropene copolymers, vinylidene fluoride-pentafluoropropene copolymers, vinylidene fluoride-chlorotrifluoroethylene copolymers and the like. Among them, vinylidene fluoride-hexafluoropropene copolymers are preferred.

Examples of the ester type thermoplastic elastomer used as the protective layer according to the present invention are polyester-polyester type copolymers comprising hard segments of polybutylene terephthalate and soft segments of an aliphatic polyester (for example, Pelprene (trade mark) manufactured by Toyobo Co., Ltd.) and polyester-polyether type copolymers comprising hard segments of polybutylene terephthalate and soft segments of polyether (for example, Hytrel (trade mark) manufactured by Toray-du Pont Co., Ltd.). Among the ester type thermoplastic elastomers, those having a melting point or a glass transition temperature of 120° to 260° C., particularly 200° to 260° C. are preferred. Since the protective layer has no influence on the light transmission property of the optical cable, it may contain suitable additives such as carbon black, glass fiber, talc, calcium carbonate, mica, calcium titanate and the like in an amount of 1 to 30% by weight.

As described in the above, preferably the optical cable of the present invention has a degree of thermal shrinkage of 5% or less. More preferably, it has a degree of thermal shrinkage of 3% or less, most preferably 1% or less.

The polymers to be used as the core and the cladding layer may be prepared by any one of per se conventional polymerization procedures.

In suspension polymerization of the core polymer, since a large amount of water is used, foreign particles tend to be included in the polymer. Further, the foreign particles may be included in the polymer in a dehydration step. Thus, the monomer and the polymerization medium are preferably purified by a conventional method such as filtration or distillation to eliminate the foreign particles and used for polymerization. Alternatively, the core polymer may be prepared by bulk polymerization. In this case, the polymer is prepared by a continuous method comprising steps of continuous bulk polymerization at high temperature and of subsequent continuous elimination of volatile materials such as unreacted monomer(s) from the polymerization product.

The polymerization of the core polymer and the application of the cladding layer are preferably carried out continuously to avoid the contamination with the foreign particles, although these two steps are not necessarily continuously carried out.

Preferably, the cladding polymer is prepared by suspension or bulk polymerization. Since the polymerization conditions for the cladding polymer has less influence on the light transmission of the optical fiber than those for the core polymer, great care as taken in the preparation of the core polymer is not needed. The polymerization can be carried out by taking care to prevent contamination with foreign particles. If necessary, the foreign particles are removed from the monomer(s) by, for example, filtration.

In one of the preferred embodiments, the optical fiber is fabricated from the core and cladding polymers by co-extruding them and spinning the integrated material (i.e. so called a composite spinning method).

For fabrication of the optical cable of three layered structure having the core, the cladding layer and the protective layer, there are several methods. One of them comprises coating the ester type thermoplastic elastomer over the optical fiber (bare fiber) to form the protective layer in a similar manner as coating a thermoplastic resin over an electrical conductor. Another method comprises co-extruding the core polymer, the cladding polymer and the ester type thermoplastic elastomer in melt states from a specially designed die to form the cable of three layered structure (i.e. so called a composite spinning method). In the composite spinning method, a composite spinning apparatus comprising three melt extruders each for the core polymer, for the cladding polymer and for the elastomer of the protective layer. The core polymer is molten in the melt extruder and quantitatively supplied to a spinning head by a metering pump. Similarly, the cladding polymer and the elastomer of the protective layer are molten and supplied to the spinning head. By a spinneret in the spinning head, three polymers are formed into a three layered structure and delivered. Then, it is cooled and wound up. Optionally, it is stretched or annealed. This method is particularly useful, since it consumes less energy and labor and can produce a wide variety of the optical cables having various diameters.

In the optical cable of the present invention, the diameter of the core or thickness of the cladding layer and the protective layer may be determined according to the specific end use of the optical cable and controlled by adjusting a diameter and a length of the orifice of the spinneret. In view of heat resistance and mechanical properties of the optical cable, preferably, a diameter of the bare fiber consisting of the core and the cladding layer is 100 to 1,100 micrometers and the thickness of the protective layer is 100 to 1,000 micrometers.

Practical and presently preferred embodiments of the present invention are shown in the following examples, wherein parts and % are by weight unless otherwise indicated.

In these examples, the attenuation of light transmission was measured by means of a transmission loss measuring apparatus (Type FP-889 manufactured by Opelex Co., Ltd.) as follows:

Using a diffraction grating spectrophotometer in which a halogen-tungsten lamp was employed as an illuminant, intensities of the outputs from the optical cable to be tested and from the standard optical cable at a wavelength of 650 nm were read off by means of a silicone photodiode. The attenuation of light transmission ($\alpha$) was calculated according to the following equation:

$$\alpha(dB/Km) = \frac{-10}{L} \log\left(\frac{I}{I_0}\right)$$

wherein L is the length of the optical cable (Km), $I_0$ is the intensity of light at the entrance and I is the intensity of light at the exit. The smaller is $\alpha$, the better is the light tramsmission of the optical cable.

The degree of thermal shrinkage was measured and expressed as described above.

The heat resistance of the optical cable was evaluated by heating it at a predetermined temperature for a predetermined period of time and comparing the optical trnasmission loss before and after heating.

The repeated flexural test was carried out by bending the optical cable around a cylinder of 10 mm in diameter at an angle of 180° and observing the appearance of the cable after 30,000 times of bending.

EXAMPLE 1

(a) Purified water (deionized water filtered through a filter having a pore size of 0.2 micrometer) (5 kg) containing, as a suspension stabilizer, dissolved hydroxyethylcellulose (0.5%), sodium polymetharylate (0.025%) and sodium dihydrogenphosphate (0.4%) was filtered through a filter having a pore size of 0.45 micrometer and charged into a 10 liter stainless steel reactor equipped with a stirrer.

To a monomeric mixture (3 kg) consisting of 79% of methyl methacrylate, 1% of methyl acrylate and 20% of bornyl methacrylate all of which had been purified by distillation under reduced pressure, 0.30% of n-dodecylmercaptan and 0.30% of lauroyl peroxide were added and dissolved. Then, the mixture was filtered through a filter having a pore size of 0.10 micrometer and charged into the above reactor and polymerized at 83° C. with stirring at 650 rpm. After about one hour, the temperature rose to 86° C. autogenously and then to 105° C. with an outer heater. At that temperature, the reaction was continued for 30 minutes followed by cooling.

The produced polymer particles were washed with water and dewatered. Then, they were charged in highly pure water to repeat washing. Thereafter, they were subjected to ultrasonic treatment at a frequency of 24 KHz (output, 300 W; MF-300-20 type manufactured by Nippon Seiki) for 30 minutes three times. The polymer particles were again washed with water, dewatered and dried at 110° C. under reduced pressure for 10 hours to obtain the polymer. Intrinsic viscosity $[\eta]=0.60$ dl/g (in chloroform, 25° C.). Refractive index=1.49.

The obtained polymer was supplied as the core material to the composite spinning head kept at 235° C. by a bent extruder heated at 220° C.

(b) A monomeric mixture of 2,2,3,3-tetrafluoropropyl α-fluoroacrylate, methyl methacrylate and methyl acrylate in a weight ratio of 87:10:3 all of which had been purified by distillation under reduced pressure, a polymerization initiator (lauroyl peroxide, 0.3% based on the weight of the monomeric mixture) and a chain transfer agent (n-laurylmercaptan, 0.3% based on the weight of the monomeric mixture) were mixed in a nitrogen atmosphere free from suspended materials and bulk polymerized at 60° C. for 2 hours. The obtained polymer was ground to obtain particulate polymer. $[\eta]=0.70$ dl/g (in ethyl acetate, 25° C.). Refractive index=1.41. Melt viscosity=$3\times10^3$ poise (235° C.).

(c) The particulate polymer obtained in the above step (b) as the cladding material and an ester type thermoplastic elastomer (Pelprene (trade mark) S-3001 manufactured by Toyobo Co., Ltd.) as the protective layer material were charged into the composite spinning head by melt screw extruders.

The core material, the cladding material and the protective layer material in a molten state were discharged from the spinneret having a nozzle diameter of 3 mm at 235° C., cooled to solidify them and then drawn and wound at a rate of 3 m/min. to obtain an optical cable of 1.61 mm in outer diameter consisting of the core of 1 mm in diameter, the cladding layer of 10 micrometers in thickness and the protective layer of 0.3 mm in thickness.

Microscopic observation of the cross section of the optical cable revealed that the core, the cladding layer and the protective layer formed the concentric circles and any bubble or foreign material was not present.

The attenuation of light transmission of the optical cable at room temperature and a wavelength of 650 nm was 220 dB/Km. After dry heating the optical cable at 120° C. for 240 hours, the attenuation was 230 dB/Km, the degree of thermal shrinkage was 1.1% and no crack was observed in the repeated flexural test.

EXAMPLE 2

(a) A monomeric mixture of tricyclo[5,2,1,0$^{2,6}$]dec-8-yl methacrylate, methyl methacrylate and methyl acrylate in a weight ratio of 30:69:1 all of which had been purified by distillation under reduced pressure, a suspension stabilizer (hydroxyethylcellulose, 0.08% based on the weight of the monomer mixture), lauroyl peroxide (0.3% based on the weight of the monomer mixture), n-dodecylmercaptan as a chain transfer agent (0.16% based on the weight of the monomer mixture) and water which had been filtered through a porous film having a pore size of 0.1 micrometer were mixed in a nitrogen atmosphere free from foreign particles and polymerized to obtain a bead form polymer as the core material. [η]=0.70 (in chloroform, 25° C.). Refractive index=1.49.

(b) The polymer prepared in the step (a) was charged into an extruder with a vent heated at 220° C. and discharged from a central portion of a double extrusion nozzle kept at 210° C. to form a strand of 7 mm in outer diameter. Simultaneously, a terpolymer of 2,2,3,3-tetrafluoropropyl methacrylate, methyl methacrylate and methyl acrylate in a weight ratio of 87:10:3 (refractive index, 1.41; melt viscosity, 3×10$^3$ poise at 210° C.) was melt coated over the discharged strand of the core polymer and drawn to obtain a strand having a core-cladding structure of 1 mm in outer. The thickness of the cladding layer was 10 micrometers.

Attenuation of light transmission of the produced optical fiber at a wavelength of 650 nm was 220 dB/Km both at 25° C. and 90° C.

(c) Over the optical fiber produced in the step (b), the same ester type thermoplastic elastomer as used in Example 1 heated at 216° C. was coated at a rate of 50 m/min. by means of an extruder to form a flexible optical cable of 2.2 mm in outer diameter.

After dry heating the optical cable at 120° C. for 240 hours, the attenuation of light transmission was 250 dB/Km, the degree of thermal shrinkage was 1.2% and no crack was observed in the repeated flexural test.

EXAMPLES 3–4 AND COMPARATIVE EXAMPLES 1–2

In the same manner as in Example 1 but using the monomers as shown in Table 1, an optical cable was produced. As shown in Table 1, the optical cables of the present invention (Examples 3 and 4) had good light transmission, thermal shrinkage and repeated flexural property after being heated at 120° C. for 240 hours, while those of Comparative Examples were poor in at least one of attenuation of light transmission, degree of thermal shrinkage and repeated flexural property after being dry heated at 120° C. for 240 hours.

TABLE 1

| Example No. | Core polymer Monomers (%) | Refractive index (20° C.) | Cladding polymer Monomers (%) | Refractive index (20° C.) | Protective layer polymer | Attenuation (dB/Km) Original (20° C.) | Attenuation (dB/Km) After heating (120° C. × 240 hrs) | Shrinking degree after heating (120° C. × 240 hrs) | Repeated flexural test after heating (120° C. × 240 hrs) |
|---|---|---|---|---|---|---|---|---|---|
| 3 | Tricyclo[5,2,1,0$^{2,6}$]-dec-8-yl methacrylate: methyl methacrylate: methyl acrylate = 30:69:1 | 1.49 | 2,2,3,3,-tetrafluoropropyl α-fluoroacrylate: methyl methacrylate: methyl acrylate = 83:14:3 | 1.41 | Hytrel 5557 (Toray-du Pont) | 230 | 230 | 1.0% | No damage |
| 4 | Adamantyl methacrylate:methyl methacrylate: ethyl acrylate = 15:84:1 | 1.49 | 2,2,3,3-tetrafluoropropyl methacrylate: methyl methacrylate: methyl acrylate = 87:10:3 | 1.41 | Pelprene S-6001 (Toyobo) | 250 | 250 | 0.7% | No damage |
| Comp. 1 | Fenchyl methacrylate: methyl methacrylate: methyl acrylate = 20:78:2 | 1.49 | 2,2,3,3-tetrafluoropropyl methacrylate: methyl methacrylate: methyl acrylate = 86:12:2 | 1.40 | Low density polyethylene with carbon | 250 | Not measurable | | |
| Comp. 2 | Tricyclo[5,2,1,0$^{2,6}$]-dec-8-yl methacrylate: methyl methacrylate: ethyl acrylate = 33:66:1 | 1.49 | 1,1,1,3,3,3-hexafluoro-8-propyl methacrylate: methyl acrylate = 95:5 | 1.41 | Polyvinyl chloride | 240 | >1,000 | 12% | Cracked |

Since the optical cable of the present invention can be used even at temperatures higher than 80° C., particularly higher than 110° C., it can be used in automobiles, vessels, air crafts, robots and the like. In addition, the optical cable of the present invention finds wider application for communications in a building or between buildings since it is usable in a wider temperature range than the conventional optical cable.

The optical cable of the present invention has better flexibility than the conventional optical cable.

What is claimed is:

1. A plastic optical cable of improved heat resistance comprising a core, a cladding layer and a protective layer made of an ester type thermoplastic elastomer and wherein the core is a polymer comprising methyl methacrylate containing 3 to 40% by weight of a methacrylic ester, the ester moiety of which has an alicyclic hydrocabon group of 8 to 20 carbon atoms.

2. The plastic optical cable according to claim 1, wherein the ester type thermoplastic elastomer is a polymer selected from the group consisting of a copolymer comprising hard segments of polybutylene terephthalate and soft segments of aliphatic polyester and a copolymer comprising hard segments of polybutylene terephthalate and soft segments of aliphatic polyether.

3. The plastic optical cable according to claim 1, which has a degree of thermal shrinkage of 5% or less after being dry heated at 120° C. for 240 hours.

* * * * *